United States Patent [19]
Klock

[11] 3,768,200
[45] Oct. 30, 1973

[54] APPARATUS FOR THE PRODUCTION OF ALGAE INCLUDING A FILTERING MEDIUM

[75] Inventor: John W. Klock, Tempe, Ariz.

[73] Assignee: Research Corporation, New York, N.Y.

[22] Filed: July 16, 1971

[21] Appl. No.: 163,366

[52] U.S. Cl.......................... 47/1.4, 210/3, 195/142
[51] Int. Cl. ..................... A01g 31/00, A01h 13/00
[58] Field of Search ...................... 47/1.4; 210/3, 6, 210/14, 15, 17; 195/139–144

[56] References Cited
UNITED STATES PATENTS

| | | | |
|---|---|---|---|
| 3,598,726 | 8/1971 | Welch .................................. | 210/3 |
| 3,155,609 | 11/1964 | Pampel .............................. | 47/1.4 X |
| 3,468,057 | 9/1969 | Buisson et al.......................... | 47/1.4 |
| 3,261,779 | 7/1966 | Sullins et al. ........................ | 210/6 X |
| 3,390,076 | 6/1968 | Dubach................................. | 210/3 |
| 3,623,976 | 11/1971 | Cessna................................. | 210/17 |
| 1,991,896 | 2/1935 | Hays .................................... | 210/17 |
| 3,385,786 | 5/1968 | Klock.................................. | 47/1.4 X |
| 2,867,945 | 1/1959 | Gotaas et al........................... | 47/1.4 |
| 3,577,678 | 5/1971 | Burton ................................. | 210/3 |
| 3,521,400 | 7/1970 | Ort....................................... | 47/1.4 |

Primary Examiner—Edgar S. Burr
Assistant Examiner—Eugene H. Eickholt
Attorney—Cushman, Darby and Cushman

[57] ABSTRACT

Waste-containing liquor is biochemically treated in a tank or cell by continuously circulating it through a filter media containing quantities of aerobic and facultative bacteria, after a quantity of the waste material is removed, the remaining liquor is directed to and circulated in an algal growth tank. Minerals such as nitrates and phosphates present in the waste liquor serve as nutrients for the growing, filamentous algae; carbon dioxide is optionally recovered from the aerobic bacterial metabolism chamber and introduced into the algal growth tank. The filter tanks and the algal growth tanks may be independently arranged for serial or parallel flow of liquor.

5 Claims, 8 Drawing Figures

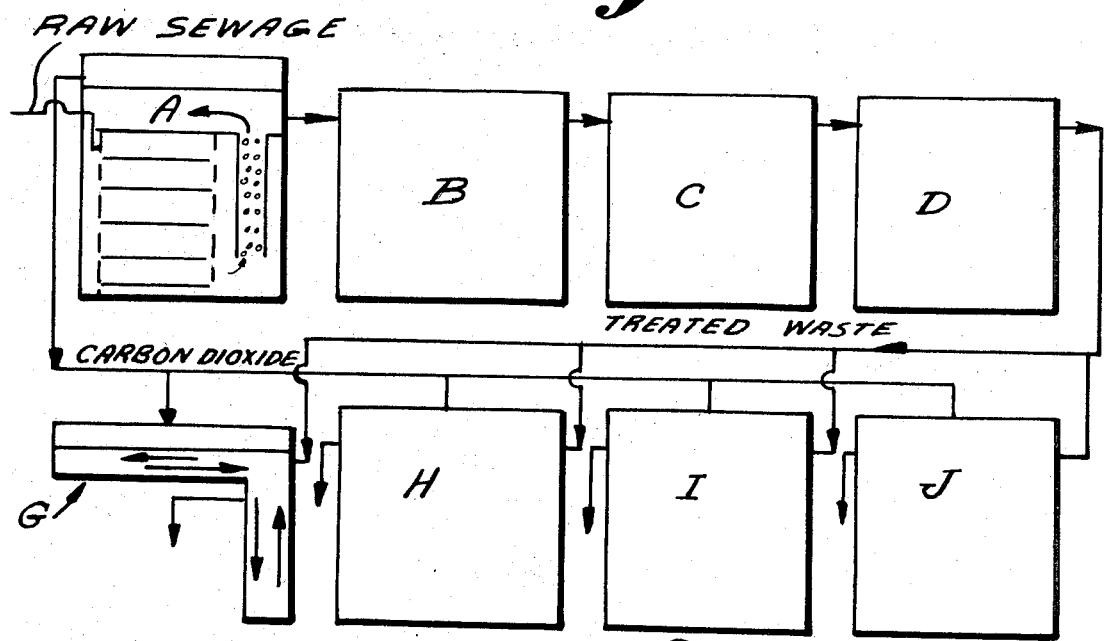
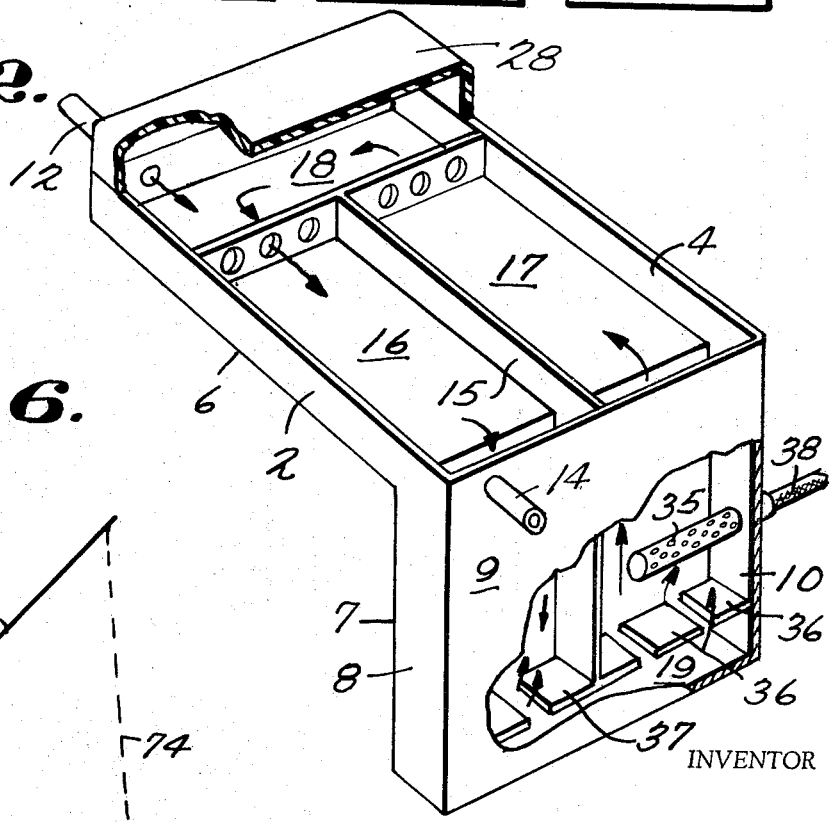
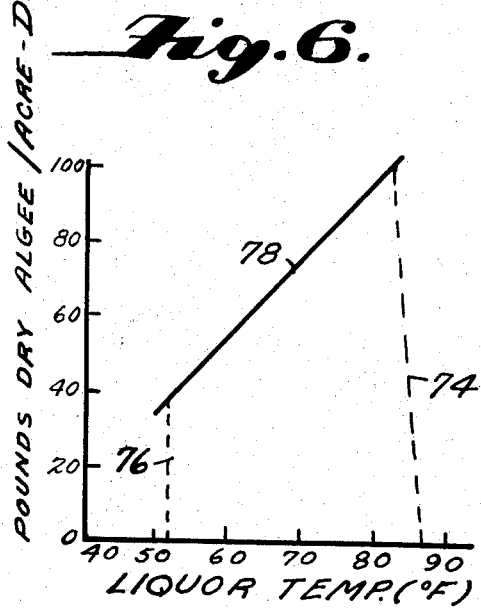

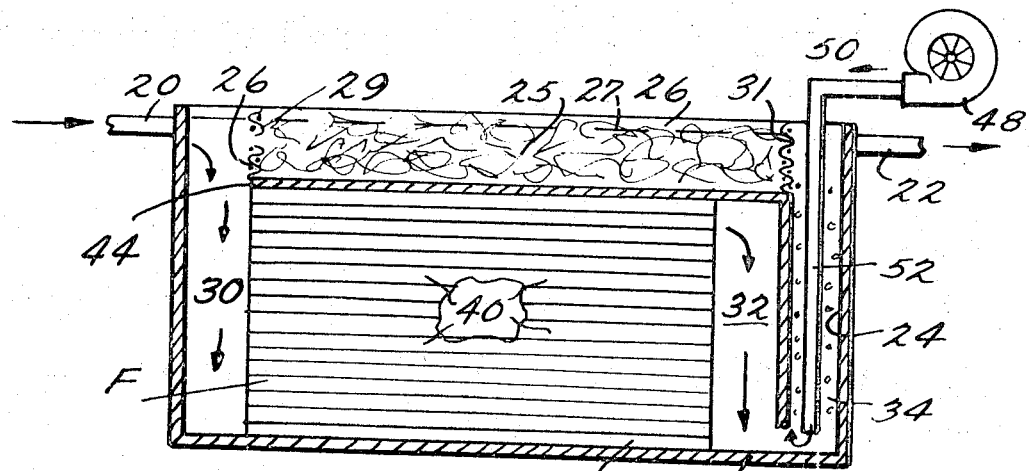
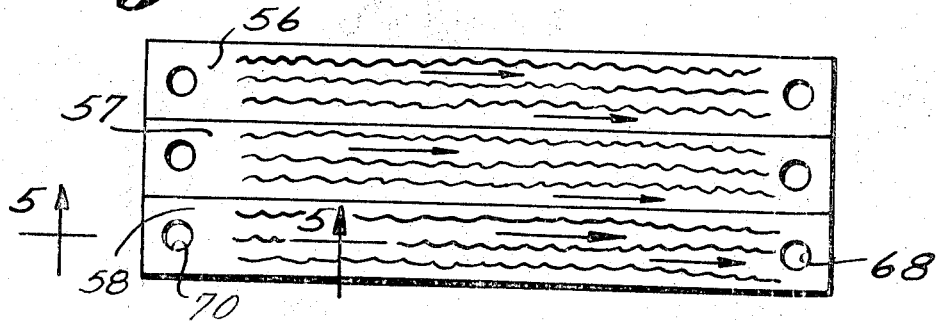
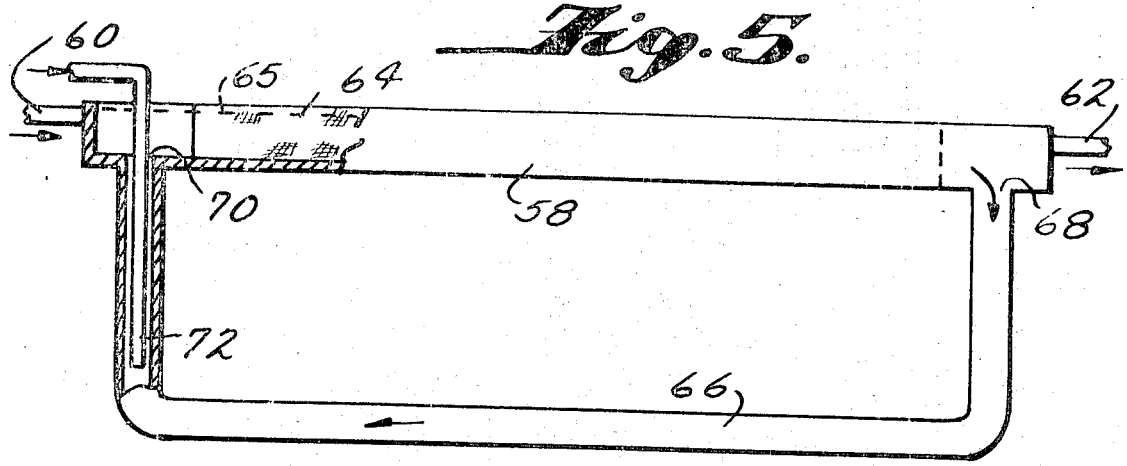

PATENTED OCT 30 1973 3,768,200
SHEET 3 OF 3
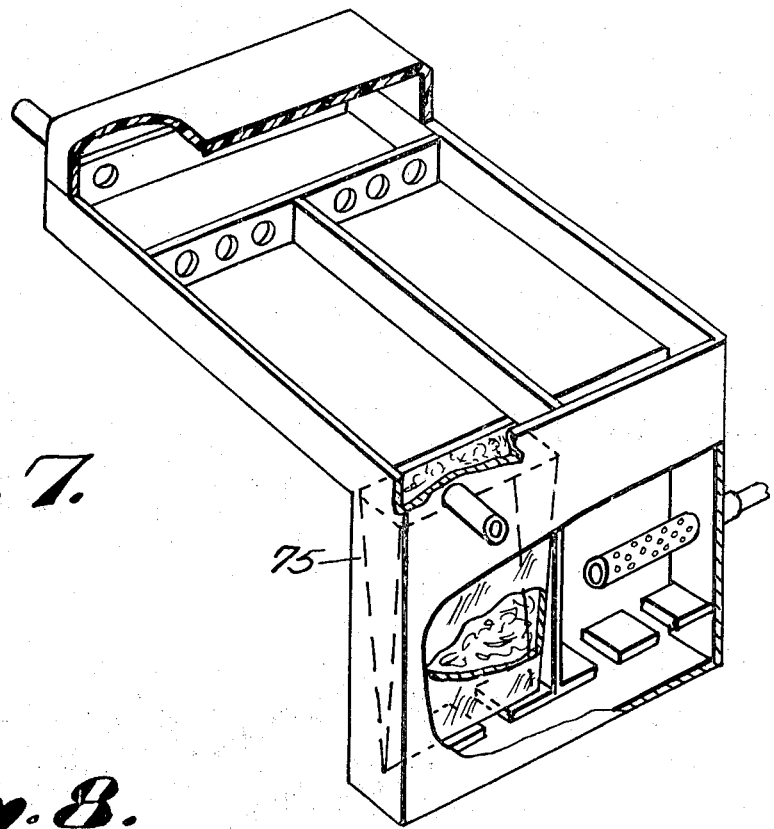
*Fig. 7.*
*Fig. 8.*
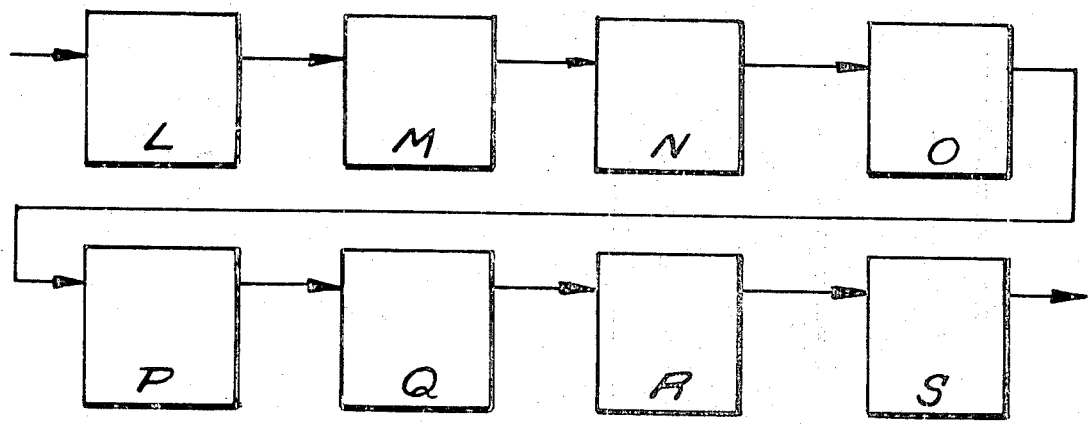
INVENTOR
JOHN W. KLOCK
BY Cushman, Darby & Cushman
ATTORNEYS

APPARATUS FOR THE PRODUCTION OF ALGAE INCLUDING A FILTERING MEDIUM

CROSS-REFERENCE TO RELATED APPLICATIONS

This application is related to my earlier copending application Ser. No. 103,271 filed Dec. 31, 1970, which is a continuation-in-part of my earlier application, Ser. No. 754,341, filed Aug. 21, 1968, now U. S. Pat. No. 3,563,888, granted Feb. 16, 1971.

BACKGROUND OF THE INVENTION

This invention relates to a process and apparatus for producing micro-organisms using waste-containing liquors, for example, at least partially treated wastes. More specifically, the present invention pertains to a process for growing algae in a liquid containing at least partially treated materials in continuation with an area for bacterial growth, waste-containing liquid is first directed into the bacterial growth area, then after at least part of the waste material is removed the liquid is directed to an algal growth area.

The growth of algae in association with nutrient liquors derived from waste water is already known. U. S. Pat. No. 2,867,945 to Gotaas et al. discloses a system wherein a pond open to the air and sun containing flowing raw sewage which is rich in bacteria is used as a container for the growth of algae. In the pond both the bacterial growth and the algal growth occur simultaneously, the pond being supplied directly with raw sewage.

The patent to Pallotta et al. U. S. Pat. No. 2,715,795 discloses the growth of a photosynthetic microorganism in an aqueous bath having one surface of the bath exposed to a dialyzing membrane. On the other side of the membrane there is a nutrient bath which may contain sewage as a source of nutrient material. The sewage material is not brought into intimate, hydraulic contact with the medium in which the algae is grown, the cellulosic diaphragm providing separate compartments for nutrient media and algal growth. Thus, there are two separate flow paths for countercurrent flow of the two fluids involved.

The patent to Cook U. S. Pat. No. 2,658,310 discloses the growth of algae in a plurality of parallel growth units, nutrient material being prepared on the addition of appropriate chemical compounds to sterilized water.

It has now been found that mixed concurrent growth of algae and bacteria together in a raw sewage medium is restricted due to the development of end products of the bacterial growth phase that are toxic to the algae. Restrictions in algal growth commonly occur because of toxic bacterial end products. This can be overcome by mechanical aeration, shallow lagoons, dilution of waste influent or other manipulations. Toxicity appears most prevalent in "natural" sewage lagoons where sewage sludge accumulates and little or no forced mixing exits. The quantity of these toxic products varies from time to time and is especially subject to diurnal and seasonal variations. This would suggest that an unstable equilibria exists between the two types of organisms. Moreover, when algae is grown simultaneously in the presence of raw sewage, due to the above-mentioned limitations, only uni-cellular algae can be used. Although this type of algae occurs frequently in nature and has a relatively rapid growth rate, it suffers from the practical limitation of small size, of the order of a few hundred microns, which makes harvesting of the algae by removal from the waste water solution both difficult and expensive.

The present invention is directed to a process and apparatus for the production of algae wherein separate chambers are provided, one for bacterial growth and the other chamber for algal growth, the two chambers being physically separated but in fluid communication with each other. Waste containing liquors are first introduced into the bacterial growth chamber containing a filtering medium and at least a portion of the waste-containing materials are removed from the liquor before it is directed into the algal growth chamber.

It has been found that fluids discharged from bacterial treatment systems are rich in the metabolic end products carbon dioxide, bicarbonate, nitrate or ammonia nitrogen and phosphates. These metabolic and products, when discharged directly into receiving waters, provide nutritive values for various forms of plant life in the receiving waters. Excessive discharges of these metabolic end products, may cause a rapid and undesired increase in the population of certain forms of plant life in the affected waters. The present invention provides a process and apparatus for substantially complete removal of the undesired mineral and carbon values from the discharged waters.

As a bacterial growth area or chamber there can be used any form of bacterial waste water treatment process provided that untreated waste water is not introduced directly into the algal growth area. Preferred bacterial growth chambers are those described in my earlier applications Ser. No. 103,271, filed Dec. 31, 1970, and its parent application of Ser. No. 754,341, filed Aug. 21, 1968 now U. S. Pat. No. 3,563,888. The entire disclosure of both applications is hereby incorporated by reference. The present invention is an improvement on my earlier work as the preferred filter-bacterial growth chamber employed in the present invention combines the elements of such processes including an "activated" bacterial culture, large surface area and submerged filtrate in which, there is a form of sedementation.

As illustrative of the application of my earlier inventions, as a bacterial growth chamber according to the present invention, one embodiment of the present invention includes a vessel or cell having filter media disposed therein to define a horizontal flow path for the liquid communicating with an air lift pump and a liquor circulation path. The vessel is filled with waste to a suitable level above the filter and the air lift pump is started. Waste begins rapidly circulating horizontally through the filter media and to the air lift pump from which is is discharged to flow back across the top of the filter media and then down and horizontally back through the filter media, etc.

As the waste circulates, particles are separated out through the filter, the larger particles gravitating or settling towards the bottom of the filter media while a dense, flocculant, aerobic bacterial culture develops throughout the filter. The submerged culture is porous and flocculant and does not adhere to the filter media as a thick slime layer which is the case, for example, in the conventional trickling filter.

Notwithstanding the significant and substantial reduction in the biological oxygen demand (BOD) of treated waste water according to my earlier inventions as previously described, quantities of unused materials having plant nutrient values remained in the effluent. In this connection the liquid effluent has a high oxidation equilibrium and is well aerated to a point near or approaching saturation, with little or no BOD. A high degree of oxidation of the waste materials is accomplished which may include oxidation to sulfates, nitrates and carbonates. Nitrogen, under certain conditions may be present as ammonia, possibly being oxidized to nitrate, depending upon the system employed. In order to metabolize these nutrients to realize a complete utilization of materials present in waste water, the effluent from the bacterial growth chamber is directed into an algal growth chamber, physically separated from but in fluid communication therewith.

The only nutrients supplied to the algal growth area are contained in the waste water from the bacterial growth area, the most important being sources of nitrogen, and phosphorous and carbon dioxide. When practicing the present invention according to a preferred embodiment and employing the bacterial chamber as hereinbefore described, the nitrogen content of the treated waste water ranges from about 20 to 30 mg per liter of liquor, present in the form of both nitrate and ammonia nitrogen the ratio depending on the hydraulic and organic loading intensity on the submerged filter. Phosphorous usually is present as the simple phosphate, and ranges from about 10 to 20 mg per liter. The carbonaceous wastes are mostly oxidized to carbon dioxide in the submerged filter which escapes as a gas unless means are provided to collect this gas and reintroduce it into the algal growth area as hereinafter described. Using only waste water materials for the algae nutrients, substantial quantities of algae are grown, particularly when the quantity of plant life produced per unit of surface area per day is compared to that of conventional agricultural production. At the same time there is no significant bacterial growth in the algal growth area. The partially treated waste liquor has a relatively low bacteria count, most of the bacteria being in the filter.

As the algal growth chamber there is used any convenient container exposed or open to the sunlight having an inlet and outlet. Preferably a walled vessel or chamber is used having a length greater than width with respect to liquor flow therethrough, thereby forming a channel. Although several shapes and designs of algal growth chambers are operable, for the sake of economy and correct practice, a channel-shaped container is a preferred embodiment. Within the channel there may be provided support means on which the algae attaches itself, thereby increasing the surface area on which the algae grows and consequently the yield. A support means, such as for instance a screen of inert metal or thermoplastic resin material e.g. saran provides a point of attachment for the individual algae filaments to prevent them from being washed from the chamber with the passing nutrient liquor. Proper aeration and oxygen exchange are important to the continued growth of the algae as is the presence of sunlight for the photosynthetic process which also takes place. The algal chamber is open at its top or uppermost surface to the suns rays, either directly exposing the contents to the surrounding atmosphere and sunlight or having a transluent or transparent covering thereover. The flow rate of nutrient liquor through the channel container in a unitary direction is a factor in the rate of algal growth. Both unicellular and filamentous forms of algae are contemplated for growth within the algal growth chamber. Filamentous algae is preferred for its ease in harvesting. An illustrative but in no manner exhaustive group of algae are mixed green filamentous cultures containing species of ULOTHRIX and STIGEOCLONIUM. These species, known for these filamentous configuration, are readily harvested, particularly when they are attached to a support means such as a screen within the chamber a relatively high oxidative equilibrium has been established, as herein described, filamentous algae can be grown. The use of filamentous algae requires substantially unidirectional and continual hydraulic flow of the nutrient media passing thereover and at a minimum velocity necessary to remove molecular oxygen and carbon dioxide bubbles from the algae, thus preventing flotation. Movement of the liquid nutrient media causes movement in the algae growing in it, thereby allowing deeper penetration of light, improving the culture depth and hence productivity. Large submerged surface areas would otherwise be required for the establishment of a substantial standing crop of filamentous algae. The velocity of the liquor through the algal growth area is subject to wide variation, provided that the velocity is sufficient to remove gas bubbles from the algae but not so great as to dislodge the algae from its support. In the embodiments as hereinafter descirbed, the liquor velocity is of the order of about 3 to 10 cm per second.

Unicellular algae are also readily grown according to another aspect of the present invention. This type of algae is desired for relatively rapid growth in circulating liquor having, in general, a lower oxidative equilibrium than required by the filamentous type.

Conservation of carbon dioxide produced in the bacterial growth chamber is an important but not essential aspect of the present invention. In the bacterial growth area, particularly using a submerged filter media, carbon dioxide is a by-product of the metabolic process therein and may be conveniently recovered, as for example by gas recovery means in association with the submerged filter, collected and introduced into the algal growth chamber. As carbon dioxide is an essential nutrient for plant growth, under enriched carbon dioxide conditions the production of algae is markedly increased. Moreover, the efficiency of the entire bacterial/algal system is improved by the uptake and metabolism of yet another waste product.

The quantity of algae produced, as hereinafter described, is directly related to the temperature of the liquor contained in the algal growth chamber. As the temperature of the liquor increases, so does the quantity of algae harvested, within normal temperature ranges, e.g. up to 30°C.

In the foregoing description, the invention has been described, for facility of discussion, as two separate areas or chambers a bacterial growth chamber and an algal growth chamber. Together these two chambers are described hereinafter as a "unit". As will be readily appreciated there may be several combinations of these two chambers having various routes of flow. For example, a plurality of bacterial growth chambers are arranged in serial flow, the effluent from one being directed into the input of the next chamber in series. The number of vessels or chambers used for bacterial growth is varied, depending upon the degree or pollution in the inflowing liquid waste and the desired degree of filtration of the effluent. The filter media in these chambers is preferably progressively smaller in size, that is, larger or coarser in the first cell and finer in each succeeding, downstream cell, in the manner taught in my earlier applications, mentioned above. In the operation of each individual chamber, the waste liquor is (1) exposed to the active bacterial culture suspended in the submerged filter media, (2) the water is reaerated and dissolved oxygen is quickly transferred to the bacterial culture, and (3) gaseous metabolic end products such as carbon dioxide are vented to the atmosphere. As an alternative these end gaseous products are collected and directed into one or more downstream algal growth units.

During the course of treatment, the waste is advantageously recycled many times in these bacterial growth chambers (for example several hundred times) and a large recirculation to throughput ratio in the vessel preferably is provided as taught in my co-pending application mentioned above. The recirculation ratio is equal to the quantity of liquor or water circulated through the air lift pump in the vessel per unit time divided by the quantity of liquor or water passing through the treatment process (e.g., passing completely through the vessel) per unit time. This ratio may vary from around 200 to about 1,000. This provides a large oxygen supply, vents the medium, and gives the organisms many chances to metabolize the impurities.

The production of carbon dioxide is generally proportional to the waste concentrations in the liquor, thus carbon dioxide is more prevalent in the initial stages of bacterial growth. However, toxic byproducts such as $H_2S$ emerge under biochemically reduced conditions and the degree of chemical reduction is also a function of waste concentrations. Thus in some instances collecting carbon dioxide from the initial bacterial growth areas is not advisable owing to hydrogen sulfide contamination, as will more fully appear.

Flow of the at least partially treated waste water (the treatment can be complete) from the bacterial growth area through the algal growth chambers may be serial or parallel. To assure the maximum amount of algal growth, parallel routes of flow are preferred; that is, the effluent from the bacterial growth area is combined and independently distributed to a plurality of algal growth chambers that separately discharge into receiving waters. The treatment of the waste water with the bacteria is carried out to an extent that the treated water does not significantly retard algal growth. The partially treated waste water does not have sufficient bacteria therein to significantly retard the algal growth when it is introduced into the algal growth chamber.

In a preferred embodiment of the present invention the nutrient-containing liquor obtained as at least partially treated waste water is recirculated within the algal growth area as much if not more than the submerged filters, possibly reading several thousand cycles. In operation, the liquor is directed into the chamber from the bacterial growth area and passed through the filamentous growing algae in a unitary direction, returned to the inlet portion of the chamber by a pump means, as for example an air lift pump, and again passed through the growing algae. This recirculation is continued several times, introducing an additional quantity of nutrient-containing liquor and withdrawing a portion of substantially exhausted liquor for discharge into appropriate receiving waters.

My previous patent applications, referred to above, both disclose submerged filter techniques. Ser. No. 754,341, filed Aug. 21, 1968, now U.S. Pat. No. 3,563,888, describes a container or cell for the biochemical treatment and metabolism of waste-containing liquor in which the flow through the filter media within is in a vertical direction and is hereinafter referred to as the "vertical flow mode". The more recent application, Ser. No. 103,271, filed Dec. 31, 1970, discloses an improved tank or cell employing separation by gravitation and having continuous circulation in a horizontal direction through the filter medium therein, and is hereafter referred to as the "horizontal flow mode". With respect to the present invention when a vertical flow mode cell or series of cells is the bacterial growth area, the algal growth area is separated from the vertical flow mode unit in the sense that they are not integral parts of the same structure but remains in hydraulic communication therewith. When the horizontal flow mode cell or plurality of cells is used as the bacterial growth chamber, the algae growth chamber is conveniently incorporated within the same general structure, physically separated from the submerged media by wall members common to both, yet in fluid communication therewith, as will more fully appear from the following drawings and description. Of course, it is not essential to combine these two chambers in a general structure as they may be suitably linked with fluid passageways.

If desired, the number of vessels or cells used in the biological treatment of the waste water can be varied as previously stated, depending upon the degree of pollution of the influent (that is, the inflowing liquid waste) and the desired degree of filtration of the effluent. While most of the impurities such as insecticides, detergents, antibiotics, and similar organic molecules are removed in the aerated filters of the biological growth areas, an activated carbon unit may be used in a subsequent procedure, as a polishing step, if desired to ensure further and more complete removal of such impurities, and also to remove odor and color.

In addition to the advantages mentioned above, other advantages will become apparent in the more detailed description of the invention which follows, reference being made to the accompanying drawings in which:

FIG. 1 is a schematic view of an exemplary bacterial algal growth system combining a plurality of bacterial growth areas in series flow with several algal growth areas in parallel flow, utilizing the present invention;

FIG. 2 is a partially cut away detailed perspective view of one of the algae growth chambers of FIG. 1;

FIG. 3 is a vertical cross-sectional view through a combined horizontal flow mode bacterial-growth chamber in combination with an algal growth chamber;

FIG. 4 is a top plan view of three algae growth trough containing support means for the algae, and FIG. 5 is a vertical sectional view taken along lines 55 — 55 of FIG. 4;

FIG. 6 is an envelope curve of algae yields with respect to the temperature of the surrounding liquor;

FIG. 7 is a detailed perspective view of an algae growth chamber adapted to collect unicellular algae; and FIG. 8 is a schematic view of an exemplary bacterial algal growth system combining a plurality of submerged filter bacterial growth areas in series flow with several unicellular algal growth areas also in series flow.

DETAILED DESCRIPTION OF THE INVENTION

Referring to the drawings, which show illustrative embodiments of the invention, FIG. 1 shows a schematic representation of bacterial growth tanks or compartments A, B, C and D arranged in series and in fluid communication with algal growth units G, H, I and J arranged to flow in parallel. Filter media is provided therein in all bacterial growth tanks and flow therethrough is in the horizontal direction.

Tanks or vessels A, B, C and D are all of similar construction and may be of any suitable configuration. In the bacterial growth portion of the process of the present invention, biochemical reactions occur in these vessels. For this purpose an active bacterial culture is suspended within the voids of the filter medium. The filter medium may comprise rock, gravel or sand, or parallel and spaced horizontally extending plates or parallel spaced extending arcuate sections of a thermoplastic material, corrugated fiberglass, or any suitable material. Waste is aerobically metabolized within the containers, and additionally, the system is designed to effectively vent metabolically derived gases, such as carbon dioxide ($CO_2$) which is recovered by the gas cover. The gas cover is positioned above the uppermost portion of the horizontal submerged filter A and collects the carbon dioxide metabolic products derived from the aerobic digestion occurring in the submerged filter media below. The gas cover is fabricated from an at least transluent and preferably transparent material. A thermoplastic material, polyvinyl chloride is preferred for ease of construction and minimum weight.

As stated, the production of carbon dioxide ($CO_2$) is proportional to the waste concentration in the water, therefore, it would be greatest in tank A and decrease progressively through series arranged tanks B, C and D. However, toxic byproducts such as hydrogen sulfide ($H_2S$) emerge under biochemically reduced conditions. The degree of chemical reduction is also a function of waste concentration. Thus tanks A and B of a series arranged system treating raw sewage may be bypassed for purposes of gas collection since they would contain $H_2S$ and $CO_2$. After the metabolism of the waste in tanks A and B, the oxidation potential increases, $H_2S$ is oxidized and the remaining gas in tanks C and D is relatively free of $H_2S$ and suitable for use in enhancing algae growth. When using a submerged filter for tertiary treatment usually insufficient chemical reduction occurs to be harmful and $CO_2$ can be obtained at any location. For illustrative purposes only the gas cover is shown in connection with submerged filter contained within bacterial growth tank A in one embodiment of the present process.

The specific size and grading of the filter media in the respective vessels may be varied in accordance with the needs of a particular system, as will be evident, and the filter media may be progressively finer, in going from tank to tank.

The number of filtration steps in the present inventive system can, of course, be altered, depending upon the degree of pollution of the influent and the desired composition of the effluent. For example, tanks A, B, C and D may be used to directly treat raw sewage or to treat and thus upgrade the effluent from a conventional activated sludge or trickling filter system (not shown). When treating raw sewage generally more than two tanks or cells A and B are used in series, when upgrading effluent from an activated sludge process two tanks or less may be used.

The combined serial effluent is directed in the embodiment of FIG. 1 from the last tank in sequence, tank D and divided between algae growth chambers G, H, I and J in a parallel flow pattern. For convenience algal growth chambers H, I and J have been shown in schematic and chamber G shown in greater detail in FIG. 2 and is hereinafter described. Carbon dioxide recovered from submerged filter A is collected and conducted to algal growth chambers G, H, I and J, also shown in greater detail in FIG. 2. Individual discharges from the several algal growth chambers are separately directed to suitable receiving waters (not shown).

FIG. 2 is a more detailed perspective view of algae growth chamber G, in this embodiment in the form of an L-shaped chamber. The chamber in its horizontal aspect consists of two parallel outer walls 2 and 4 and a bottom wall 6; in its vertical aspect vertical walls 7, 8, 9 and 10, parts of which have been broken away for illustrative purposes; inlet 12 and outlet 14; a dividing wall 15 defining two separate channels, one of which, 16, has a flow in a downward direction and the other of which, channel 17, has an upward direction of flow. 18 is a return recirculation passageway in the horizontal portion of the chamber and a return recirculation passageway 19 is provided in the vertical portion of the chamber.

An air lift pump 35 is provided upstream from perforated wall 36, the pump being supplied with compressed air (not shown). At the opposite end of channel 16 is perforated wall 37. Within channels 16 and 17 screens or support means (not shown) may be provided for the growth of the algae.

In operation at least partially treated waste-containing liquor is supplied to inlet 12, for instance from the submerged filter system of FIG. 1 and introduced into return recirculation passageway 18. Air or other suitable gas, for instance, byproducts from the submerged filter, is pumped in through conduit 38 and is used as bubbles in channel 17 in the space between walls 10 and 15, to provide a lift pump action in the manner disclosed in my earlier applications. The liquor containing algal nutrients is then circulated and recirculated through the chamber. A portion of the recirculating liquor is discharged through outlet 14 to suitable receiving waters (not shown).

In order to increase the algal production a translucent or transparent gas cover 28, e.g. of polyvinyl chloride as shown partially broken away, is placed over the horizontal portion of the L-shaped algal growth chamber. Carbon dioxide gas is collected in the bacterial growth portion of the system and introduced by means of an appropriate conduit (not shown) to the environment of the growing algae. Due to the turbulence and surface area of the recirculating liquor so exposed, the carbon dioxide is readily dissolved by the water and taken up by the growing algae. It will be apparent that there are other methods of introducing carbon dioxide into the circulating and recirculating liquor in the algal growth chambers, such as, for instance, pumping compressed carbon dioxide gas into the air lift pump 35. Carbon dioxide can be derived from the submerged filter or other commercial sources. The gas can be administered either through the air lift pump 35 or it can be simply allowed to issue into a plastic dome over the water surface as shown by gas cover 28. When injecting it through the air lift pump, a gas cover is not necessary, but when using absorption, a cover or dome is necessary. For convenience, however, the instant embodiment employs compressed air for the air lift pump and in this manner shares the same source of compressed air as does the air lift pump in the submerged bacterial filter area, as hereinafter discussed.

FIG. 3 shows a combined bacterial growth chamber and algae growth chamber in one unit. The basic tank or chamber with respect to the bacterial growth area is as shown for tank A of FIG. 1, an algal growth chamber being provided in the return passageway. Absent the algal growth members 29 and 31 in channel 25 the unit would be substantially similar to unit A (and units B, c and D) of FIG. 1. As hereinafter discussed, FIG. 3 is directed to a combined unit.

As shown in FIG. 3 the combined unit includes inlet 20, outlet 22, filter media F, air lift pump 24, and return or recirculation passageway 26 above the filter media F. An inlet chamber 30 is formed in the tank at one end of the filter media F and an outlet chamber 32 at the other end. An air lift means is provided in tubular passageway 34 which opens at its upper end to return or recirculation passageway 26 and also to the outlet 22. A solid plate 44 separates return passageway 26 from the filter media F, the plate 44 being opaque to light and impervious to the passage of liquors between recirculation passageway 26 and filter media F. A preferred material is resin-coated or reinforced wood or thermoplastic sheet or film of substantial thickness.

The tank shown in FIG. 3 is of rectangular vertical sectional configuration, having a greater length than height. For the more concentrated wastes, a larger length to height ratio is preferable to increase the surface length of passageway 26 thus increasing aeration time and reducing oxygen transfer time in the filter media F.

The plates 40 may be made of any suitable material, such as vertically spaced horizontally extending arcuate sections of thermoplastic material placed in a horizontal direction with respect to the direction of flow of the liquor and arranged so as to present the maximum surface area. The air lift means is shown as including a compressor or pump 48 and a discharge conduit 50, 52, the section 52 extending concentrically within conduit 34 and terminating in an outlet disposed above the bottom wall 54 of the tank A. The upper end of conduit 34 is shown connected to plate 44 and opening to passageway 26 and outlet 22.

Air or other suitable oxygen-containing gas is pumped through conduits 50, 52 and will rise as bubbles in conduit 34, in the space between the conduits 34 and 52, to provide a lift pump action, in the manner disclosed in my earlier applications. While the filter media has been shown in FIG. 3 in the form of plates 40, it will be appreciated that rock or other spherical or roughly spherical media may be used as previously discussed.

The algae growth portion of the unit positioned in passageway 26 is algae growth channel 25 extending the length of plate 44 and defined on either end by perforated walls 29 and 31 provide means for retaining the growing algae in the recirculating liquor flow and optional support means for screens (shown in FIG. 4) on which the algae grows. The top portion of passageway 26 and algae growth chamber 25 is exposed to sunlight, either by being open directly to the atmosphere, or covered by a translucent or transparent cover (not shown). Dashed line 27 indicates the fluid level of the liquor contained within the tank.

In the horizontal flow mode tanks or cells of the bacterial growth portion of the present invention, it will be seen that the waste-containing liquor to be treated is introduced to the first tank through inlet 20. A sufficient quantity of waste is introduced to completely submerge the filter F. The pump 48 will discharge the oxygen-containing gas into conduit 34 whereby the liquor will be drawn horizontally through the filter F then up through the conduit 34, after which some of the liquor will recirculate through passageway 26 and pass through the algae in channel 25 (and back through filter F) while some of the liquor will discharge through outlet 22. Thus, a continuous circulation and recirculation of liquor within the tank or cell will be effected.

The column of oxygen-containing gas which emanates from the outlet of conduit 52 does not merely entrain and lift the liquid waste upwardly. First, it lifts at a rate which ensures a rapid circulation and hence a high metabolic rate. Secondly, as it lifts the liquid waste through tube 34, the oxygen in the air permeates the liquid waste which is entrained in the air column, thus transferring a sufficient quantity of oxygen to the waste to "re-trigger" or "re-invigorate" the process of aerobic metabolism. Oxygen is rapidly exhausted during aerobic bacterial metabolism. Hence oxygen must be continually supplied in order to ensure that the waste is effectively metabolized. For facility of discussion reference will be made to portions of FIG. 3 corresponding to tank A of FIG. 1 as will be apparent. When operating according to one embodiment of the present invention gaseous metabolic end products such as carbon dioxide are released to the surface of the liqor in passageway 26 and are collected by gas cover 28 and applied to the algal growth units G, H, I and J as hereinafter described. With reference to FIG. 1, a preferred embodiment of the present invention, a plurality of baffles are provided (not shown) in the passageway 26 of tank B. These baffles promote turbulence which, in some installations, is believed to be important to improve oxygen transfer during flow through the return passageway. The return passageway of tank B is open at its top to the atmosphere. When tanks A, B, C and D are arranged in series flow the size of the filter media in tanks A, B, C and D preferably gradually decreases in size so as to affect more complete filtration. It should also be evident that various submerged filter units of the horizontal and vertical flow types referred to, may be arranged in parallel, or series-parallel, as well as in series. Also, recycling of waste water to upstream units may be provided for, if desired. Such modifications, as well as others, would be obvious to one skilled in the art and are within the scope of the invention.

The algal growth portion of the present invention need not be combined in the same unitary structure as shown in the embodiment of FIG. 3 but also may be physically separated from the bacterial growth chamber or chambers so long as it is hydraulically connected therewith. FIGS. 4 and 5 are representative embodiments of algal growth chambers in the form of three parallel troughs or channels 56, 57 and 58. For discussion purposes channel 58 will be described in detail, it being realized that channels 56 and 57 are identical in every respect thereto. FIG. 5 is a plane sectional view of channel 58 taken along line 5—5. Inlet 60 and outlet 62 are provided in opposite ends of channel 58, inlet 60 in fluid connection with a bacterial growth area such as tank D of FIG. 1 by means of a conduit (not shown). Channel 58 has parallel walls and ends defining a rectangular area containing a plurality of screens 64 for the support of growing filamentous algae in the turbulent circulating liquor passing therethrough. The screens 64 are constructed of any inert, corrosion-resistant material, such as, for instance thermoplastic materials as nylon and polypropylene. Algae is conveniently harvested in place or from removably attached screens depending on the needs of the system. The fluid level is indicated by dashed line 65. A circulation and recirculation path 66 is provided having air inlet 68 and outlet 70 and an air lift pump 72 supplied with pressurized or compressed air (not shown). As air pressure is applied to air lift pump 72 air bubbles rise and cause circulation of the nutrient-containing liquor over the growing filamentous algae and into the recirculation inlet 68 for additional cycles. A portion of the circulating liquor is drawn off as additional liquor enters the circuit via inlet 60. The screen material 64 is not placed directly over inlet 68 and outlet 70 as a unidirectional flow of liquor is desired over the growing algae. The top surface of channel 58 is exposed to sunlight, such as being open directly to the atmosphere or having a translucent or transparent cover thereover.

In operation quantities of nutrient-containing liquor are introduced from an appropriate bacterial growth chamber (not shown) through inlet 60, passed over the growing algae attached to screen support 64, through recirculation path 66 inlet 68, past air lift 72, out recirculation path outlet 70 and again over screens 64. A portion of the recirculating liquor is withdrawn through outlet 62 and passed directly into receiving waters (not shown). In this manner continuous, unidirectional circulation is maintained over the algae growing area, substantially all of the algae-nutrient values are removed from the recirculating liquor and the algae thus grown is conveniently and economically harvested.

Of course, the uppermost portion of channel 58 may be covered with a suitable gas cover (not shown), as previously discussed and shown in FIGS. 1 and 2, thereby introducing carbon dioxide into the algae growth environment. Other means of introducing carbon dioxide into the recirculating liquor may also be used.

A modification of the above channels is possible (not shown) by omitting the recirculation passageway. Thus the liquor is merely introduced into the channel, passed over the algae growth area and discharged into the receiving. Although such an embodiment would not produce as high yields as the recirculation methods disclosed herein, the structure is an expedient for removing unused and carbon values from the treated liquor.

A direct relationship has been found to exist between the temperature of the circulating and recirculating liquor surrounding the growing algae and the quantity of algae produced. FIG. 6 represents an envelope curve of the data showing the upper temperature limit (line 74) and the lower temperature limit (line 76) and their relationship to the maximum yield to temperature (line 78). Algae yields are expressed herein as pounds per day per acre of water surface area exposed to the sun based on 60 weekly filed measurements, temperature reported in °F on a weekly average. The direct relationship is striking: as the temperature of the surrounding liquor increases, so does the quantity of algae thus produced. As a point of reference 100 pounds of dry algae per acre-day represents a yearly total of about 18.3 tons of dry algae per year. This represents a growth rate significantly higher than conventional agriculture production. The temperature of the liquor surrounding the algae is influenced by a number of variables, among them the ambient temperature of the entire process, amount of sunlight, temperature of input untreated waste water into the initial bacterial filter and the like. Although I prefer to practice my invention at ambient temperatures, it is also possible to apply additional heat at any stage of the process, for instance in one embodiment of the invention as the at least partially treated waste water is conducted from the bacterial growth chamber to the algal growth chamber.

FIG. 7 is a detailed view of another illustrative embodiment the L-shaped algae growth chamber of FIG. 2. An algae collection means has been inserted in the downward portion of channel 16, shown for illustrative purposes as a filter bag 75. A substantial woven material as nylon or the like may be conveniently used. Of course, other collection means for unicellular algae such as settling basins and the like may also be employed to use to advantage the settling characteristics of this form of algae.

FIG. 8 is related to Example 2 and shows a schematic representation of bacterial growth tanks L, M, N and O arranged in series flow and in fluid communication with unicellular growth units P, Q, R and S. This embodiment is adapted for the production of unicellular algae. The bacterial growth tanks are as described in FIG. 1 and the algal growth areas are as described in FIG. 7. In algal growth areas P, Q, R and S, as the algal cells age the dispersive characteristics thereof give way to colligative and flocculative stages. Thus in cell P maximum water velocity is maintained at all times to minimize cell sedimentation and sweep the algae into the following algae growth areas, tanks Q, R and S, were a minimum velocity compatible with good growth is maintained in order to maximize flocculation and sedimentation. When the algae thus produced is harvested all algal growth tanks are operated at a maximum water velocity to sweep the algae thus produced into the filter bags 75. The bags are then allowed to drain and the algae is removed.

Unless otherwise stated, all parts and percentages used herein are by weight.

EXAMPLE 1

Three separate metal trays or troughs, each having dimensions of about 9 inches wide, 5 inches deep and 13 feet long and substantially as shown in FIGS. 4 and 5 were provided with filamentous algae, Ulothrix, and supplied with effluent from a submerged filter bacterial growth unit according to my horizontal flow mode at the rate of from 100 to 200 ml per minute per trough, depending on the loading of the horizontal filter. After several days of operation algal yields were measured at 96 pounds per acre-day dry weight (450 pounds wet weight).

EXAMPLE 2

Four submerged filter horizontal units arranged in series flow in communication with four algae units arranged in series flow and substantially as shown in schematic in FIG. 8 were provided. Raw, non-settled sewage having a BOD (5 day, 20°C.) of 210 was introduced into tank L and treated according to the process described in my earlier applications. The effluent passed into algae growth tank P had a BOD of between 5 and 10, depending on loading. The following measurements were made:

| | Algae Cell | | | |
|---|---|---|---|---|
| | P | Q | R | S |
| Settled algae vol., ml/liter sample | ml. | ml. | ml. | ml. |
| Settling time, | | | | |
| 0 minutes | 1000 | 1000 | 1000 | 1000 |
| 5 | 600 | 70 | 135 | 20 |
| 10 | 445 | 65 | 110 | 27 |
| 24 | 348 | 65 | 103 | 28 |
| 30 | 320 | 62 | 101 | 28 |
| Settled Algae Wt. (g), dry | 11.24 | 2.32 | 3.60 | 1.15 |
| Algae Volume Index[1] | 28.5 | 26.7 | 28.1 | 24.3 |
| Non-settling Algae in 1-liter Sample (g) | 0.485 | 0.387 | 0.414 | 0.167 |
| Algae Settled (%) | 95.9 | 85.7 | 82.3 | 88.0 |
| pH | 8.3 | 9.6 | 10.0 | 10.1 |
| Detention Time (days)[2] | 1.5 | 3.0 | 4.5 | 6.0 |

[1] Volume of settled algae per gram of algae
[2] 12 hours of influent flow during daylight, 12 hours of no influent flow at night As used above the Algae Volume Index is comparable to the Sludge Volume Index. As used to measure the efficiency of an activated sludge settling characteristics it ranges from 40 to 200; good settling sludge is generally from 40 to 100 and bulking or non-settling sludge has a value of 150 and up. As another means of comparison submerged filter sludge, as in tanks ranges from 35 to 50. The overall algae settled in the system was 92.5 percent.

What is claimed is:

1. Apparatus for the production of algae comprising:
   A. a first vessel for bacterial growth,
   means communicated to said first vessel for introducing said liquor into said first vessel,
   means communicated to said first vessel for withdrawing said liquor from said first vessel,
   a filtering medium in said first vessel;
   means defining an open fluid passageway adjacent to said medium,
   said passageway having inlet means adjacent one end of said media and a first outlet means adjacent the other end of said media spaced from each other within said first vessel to provide with said filtering medium a path within said vessel for the continuous circulation and recirculation of liquor in said first vessel, pumping means operatively associated with said passageway first inlet means to provide a flow of oxygen-containing gas through said passageway, thereby causing said passageway to have a flow of liquor therethrough in a single direction such that liquor passes horizontally through said filtering medium and then through said passageway;
   second outlet means operatively connected to said path for withdrawal from said first vessel of some of the liquor circulating in said path and
   B. a second vessel for algal growth communicated to said means for withdrawing said liquor from said first vessel, said second outlet means including means for introducing waste liquor into said second vessel,
   means defining a channel in said second vessel,
   means within said channel for support of said algae,
   gas passageway means within said channel between said inlet means and said outlet means,
   pumping means operatively associated with said passageway defining means to provide a flow of oxygen-containing gas through said passageway, thereby causing flow of liquor through the passageway in a single direction and arranged so as to continuously circulate said liquor within said second vessel.

2. Apparatus as defined in claim 1 wherein the filtering medium in said first vessel-second chambr is substantially submerged in said waste liquor.

3. Apparatus as defined in claim 2 and further including:
   a plurality of said bacterial growth vessels operatively associated with said second vessel;
   means for serial circulation of said liquor from one of said bacterial growth vessels to the next of said bacterial growth vessels; and
   outlet means operatively connecting the last of said bacterial growth vessels with said algal growth vessel.

4. Apparatus as defined in claim 3 further including a plurality of said algal growth vessels having means operably associated therewith for the parallel flow of said at least partially treated waste liquor therethrough.

5. Apparatus as defined in claim 4 further including:
   means for collection of carbon dioxide gas operably connected to at least one of said bacterial growth vessels, and
   means for introducing said carbon dioxde gas thus collected into each of said algal growth vessels.

* * * * *